United States Patent Office 3,579,621
Patented May 18, 1971

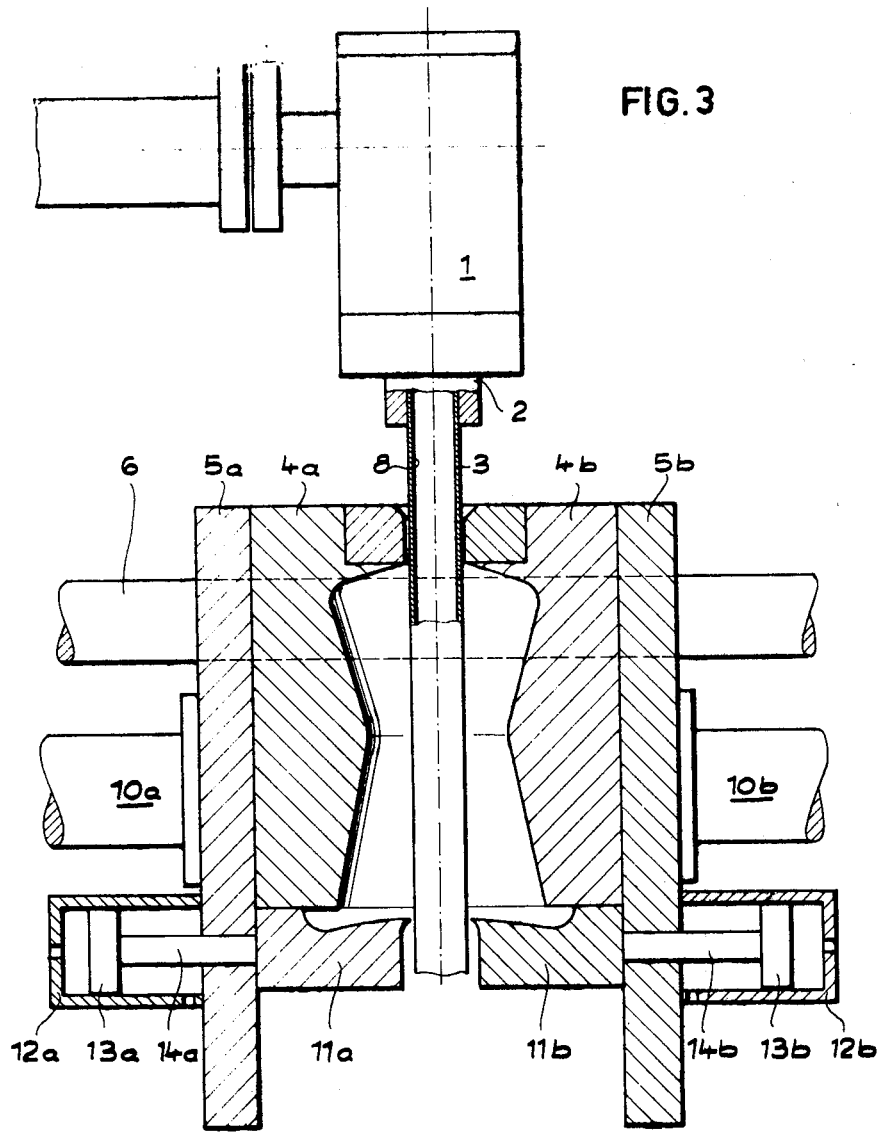

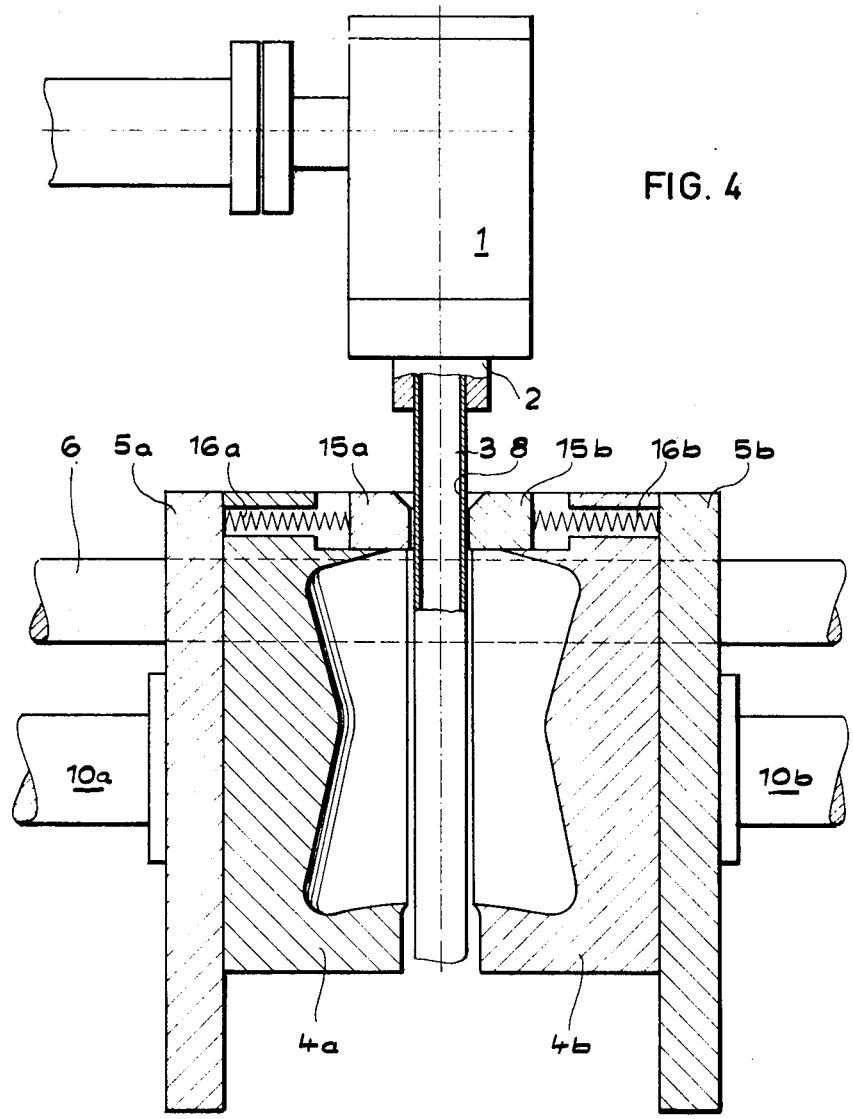

3,579,621
METHOD AND APPARATUS FOR FORMING HOLLOW PLASTIC ARTICLES
Gottfried Mehnert, Berlin-Mariendorf, Germany, assignor to Conduco AG, Zug, Switzerland
Filed Nov. 7, 1968, Ser. No. 774,091
Claims priority, application Germany, Nov. 10, 1967, P 17 04 209.0
Int. Cl. B29c 17/06, 17/07, 23/00
U.S. Cl. 264—99                               13 Claims

ABSTRACT OF THE DISCLOSURE

The extruder of a blow molding apparatus extrudes a tubular blank and moves continuously with reference to a series of sectional blow molds or vice versa. The movements of mold sections to closed positions are timed in such a way that the upper end of the extruded portion of the blank is clampingly engaged by the mold sections later than the lower end or vice versa, always with such a delay that the axis of the thus engaged portion of the blank is coaxial with the mold cavity. This is achieved by pivoting the mold sections between upright and inclined positions or by providing the mold sections with movable upper or lower blank-engaging parts.

BACKGROUND OF THE INVENTION

The present invention relates to a method and apparatus for forming hollow plastic articles by the blow molding process.

It is already known to employ in a blow molding apparatus a so-called carrousel type carrier for open-and-shut blow molds. The molds move past a single extruder which discharges a tubular blank of softened plastic material, and the jaws at the upper and lower ends of mold sections pinch the blank to separate therefrom parisons which are thereupon expanded to form shaped articles. Reference may be had to Pat. No. 2,515,093. A drawback of such apparatus is that the system which supplies hydraulic and pneumatic fluids serving to open and close the molds as well as to expand the parisons is very complicated and prone to malfunction.

It was further proposed to employ in such apparatus a set of stationary molds and a system of circulating extruders which are movable into registry with the molds. Such apparatus are satisfactory in certain respects because the extruders are normally connected only to a source of electrical energy which can be readily achieved by resorting to slip rings or analogous known current supplying devices.

A drawback which is common to the aforedescribed conventional apparatus with travelling molds or travelling extruders is that the extruded portion of the blank tends to sway back and forth or to assume an inclined position when it enters the space between the sections of an open blow mold. It is very difficult to time the movements of mold sections in such a way that the extruded portion of the blank is exactly coaxial with the mold cavity. The problem is especially acute when the extruders or the molds are moved intermittently.

In all such conventional apparatus wherein the molds or the extruders travel continuously along an endless path, the lower end of the extruded portion of the blank is engaged earlier than the upper end so that, if the upper end is to be engaged at the desired moment, the lower end is engaged before it assumes an optimum position with reference to the mold sections. Alternatively, and if the operation is timed in such a way that the lower end of the extruded portion of the blank is engaged at the desired moment, the upper end is engaged too late. In each instance, the resulting blow-molded article is of inferior quality because the formation of seams or webs is irregular. In many instances, such apparatus fail to produce any satisfactory articles.

SUMMARY OF THE INVENTION

It is an object of my invention to provide a novel and improved method of producing hollow plastic articles by the blow molding method, and more particularly to provide a novel method of properly relating the movements of mold sections with the rate of extrusion of tubular blanks in such a way that the method will produce highly satisfactory articles despite the fact that the continuously extruded blank travels with reference to a set of blow molds and/or vice versa.

Another object of the invention is to provide a method according to which a series of blow molds can receive parisons at rapid intervals and according to which each mold receives a parison in an optimum position for further treatment resulting in the formation of a bottle or another hollow plastic article.

A further object of the invention is to provide an apparatus which can be utilized in the practice of the above outlined method.

An additional object of the invention is to provide novel blow molds which can be utilized in the apparatus.

Still another object of the invention is to provide an apparatus which can properly manipulate parisons obtained on severing of blanks which are inclined with reference to a vertical position during engagement with the sections of blow molds.

The method of my invention comprises a first step of continuously extruding a tubular blank of softened deformable synthetic plastic material and effecting relative movement between the blank and a series of blowing stations each of which accommodates an open-and-shut mold whereby successive elongated portions of the blank enter successive blowing stations, a second step of severing successive portions at the respective blowing stations so that each such portion yields an elongated tubular parison, a first additional step of clampingly engaging one end of each portion of the blank at the respective station ahead of the other end, and a second additional step of clampingly engaging the other end of the portion of the blank at the respective blowing station in such a way that, during engagement of the other end of a blank portion, the latter's axis coincides with the axis of the mold cavity at the respective station. The second step (i.e., the conversion of a portion of the blank into a parison) can take place simultaneously with one of the additional steps or it may follow at least one additional step, i.e., the blank can be severed at the time when one end of its extruded portion is engaged by the mold sections, at the time when its other end is engaged by the mold sections or subsequent to engagement of the one or the other end. As a rule, the blank is extruded substantially vertically downwardly and the relative movement between the blank and the blowing stations can be brought about by moving the extruder with reference to the blowing stations and/or vice versa.

The simplest way of insuring that the portion of the blank which is located between the sections of a mold at a blowing station is coaxial with the mold cavity defined by such sections is to install the mold in inclined position so that, when the lower end of a portion of the blank is engaged first by the lower parts of mold sections, and the thus engaged portion of the blank is inclined with reference to the next-following portion of the blank due to relative movement between the extruder and the mold, the inclination of the axis of the mold cavity is identical with inclination of the engaged portion of the blank at the very moment when the upper end of the engaged portion of the blank is engaged by the upper parts of the mold sections. If desired, the mold can be returned to upright position so that the axis of the parison therein is vertical before the thus positioned parison is converted into a blow-molded article. The inclination of the axis of the mold cavity is greater if the speed of relative movement between the blank and the cavity increases, if the diameter of the blank is increased and/or if the length of the mold cavity is greater.

The same result can be achieved if the mold sections comprise upper or lower parts which are movable relative to the remaining parts of such sections. Thus, and if the mold sections comprise lower parts which are movable independently of the remaining parts of the mold sections, the remaining parts of the mold sections engage the upper end of the corresponding portion of the blank and such portion is then permitted to assume a truly vertical position by gravity before its lower end is engaged by the lower parts of the mold sections. Alternatively, and if the mold sections having upper parts movable with reference to the remaining parts thereof, such upper parts can be moved into engagement with the upper end of a portion of the blank ahead of the remaining part of each mold section; again, the portion of the blank is then free to assume a vertical position prior to clamping engagement between its lower end and the corresponding mold sections.

The manner in which the parisons in the cavities of the blow molds are thereupon expanded, either by admission of compressed blowing gas and/or by suction in the surrounding part of the mold cavity is well known and forms no part of the present invention. Such expansion takes place while the mold is out of registry with the extruder and is completed and the resulting hollow article ejected before the nozzle of the extruder returns into registry with the mold cavity.

The novel features which are considered as characteristic of the invention are set forth in particular in the appended claims. The improved blow molding apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWINGS

FIG. 3 is a similar schematic view of an apparatus which embodies another presently preferred form of the invention; and FIG. 4 is a similar schematic view of an apparatus which constitutes a modification of the apparatus shown in FIG. 3.

DESCRIPTION OF THE PREFERRED EMBODIMENTS

Figure 1:
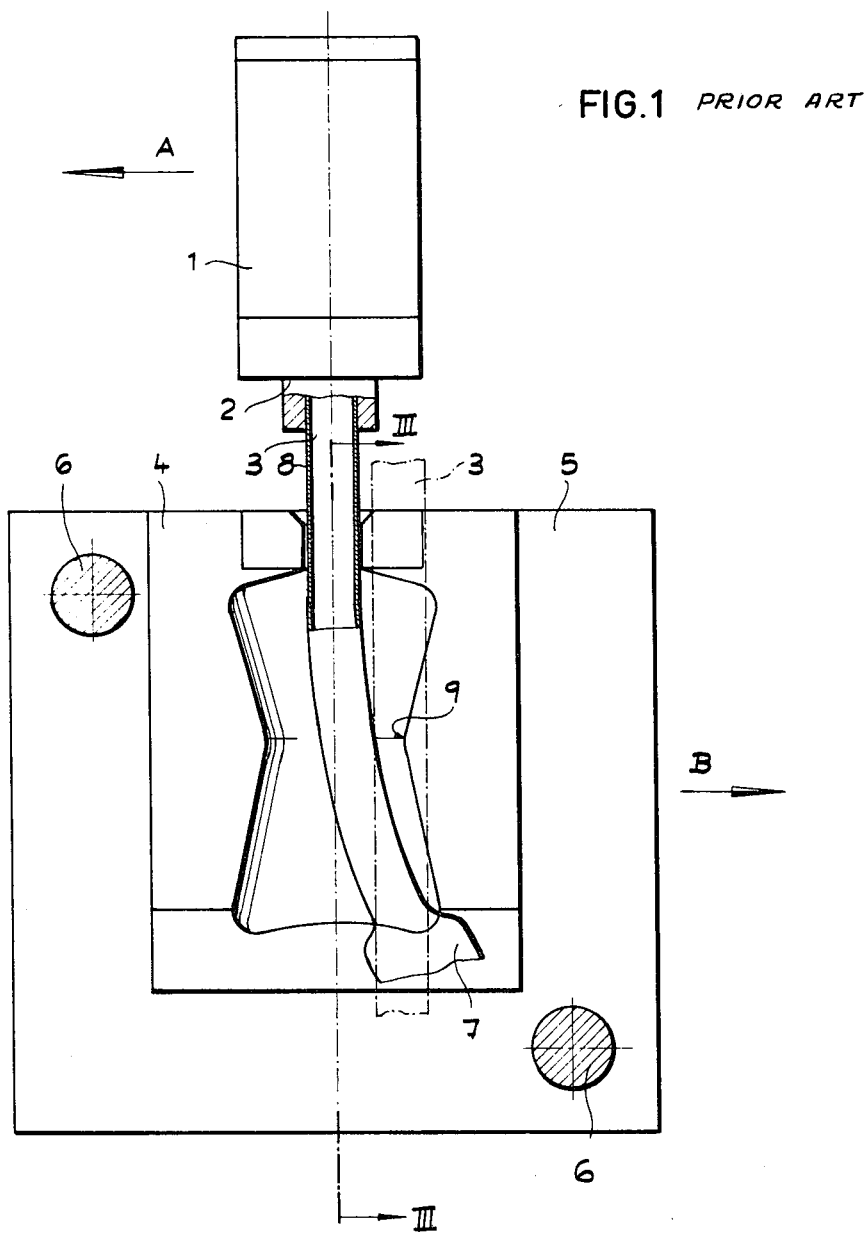
FIG. 1 is a schematic partly elevational and partly vertical sectional view of a blow molding apparatus.

Referring first to FIG. 1, there is shown a portion of a blow molding apparatus which comprises an extruding machine or extruder 1 having an outlet or nozzle 2 which discharges a continuous tubular blank 3 of synthetic thermoplastic material. The apparatus further comprises several open-and-shut blow molds each having two mold sections 4 (only one shown) mounted on platens or holders 5 which are reciprocable toward and away from each other to respectively close and open the mold. The platens 5 are reciprocable along tie rods 6 which form part of a conveyor moving continuously in the direction indicated by arrow B. Instead of continuously moving in the direction of arrow B, the molds can remain stationary if the extruder 1 is caused to move continuously in the direction indicated by arrow A. It is also possible to move the extruder and the molds. For the purposes of this description, it is assumed that the extruder 1 moves in the direction indicated by arrow A and that the apparatus comprises a succession of stationary molds.

When the mold sections 4 of the illustrated mold are caused to move toward each other along the tie rods 6, the lower portions of such mold sections engage the lower end 7 of the extruded portion of the blank 3 at a time when the extruder 1 is in a position in which the blank is in the phantom-line position of FIG. 1. The upper end 8 of the extruded portion of the blank 3 remains attached to the increments which issue from the nozzle 2 whereby the blank is flexed and assumes the solid-line position of FIG. 1 when the end 8 is engaged by the upper end portions of the mold sections 4. When the sections 4 approach each other sufficiently to prevent further movement of the upper end 8 in the direction indicated by arrow A, the blank tears automatically or is severed by a hot wire or another suitable cutter, not shown.

The parison which is obtained upon severing of the extruded portion of the blank from plastic material which issues from the nozzle 2 does not extend vertically in the mold cavity 9 which is defined by the mold sections 4. Therefore, such a parison will normally yield an inferior hollow plastic article because, when the parison is expanded internally and/or by suction in the surrounding part of the cavity 9, the seam or seams will be located off the central symmetry plane of the mold cavity. This is due to the fact that those portions of the surface surrounding the mold cavity which are pointed out by the arrowhead on the lead line of the numeral 9 will be first to come into contact with material at one side of the parison; therefore, such side of the parison will be cooled more rapidly than the other side.

Figure 2:
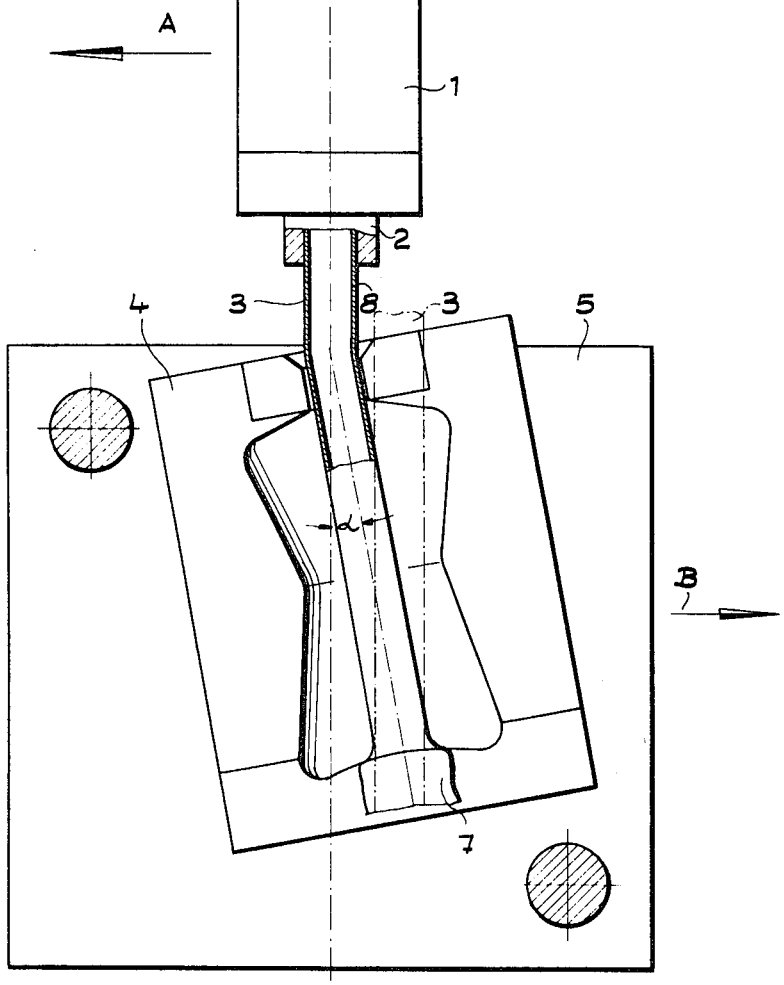
FIG. 2 is a similar schematic view of a blow molding apparatus which embodies one presently preferred form of my invention.

FIG. 2 illustrates a second blow molding apparatus which is superior to the apparatus of FIG. 1. The mold sections 4 are temporarily held on the respective platens 5 at such an angle (alpha) that the parison is coaxial with the mold cavity when the blank is severed by the upper portions of the mold sections or by a separate cutter. The magnitude of the angle alpha depends on the speed of relative movement between the mold sections and the extruder 1, on the diameter of the blank 3, and on the length of the mold cavity.

An important advantage of the apparatus shown in FIG. 2 is that it can employ very simple blow molds. All that is necessary is to install the mold sections 4 in such a way that they are pivotable with reference to the respective platens 5. Suitably calibrated scales are preferably provided on the platens to facilitate accurate selection of the inclination of mold sections. As stated before, the inclination of the axis of the mold cavity 9 with reference to a truly vertical position (angle alpha) is proportional to the relative speed between the extruder 1 and the mold, to the diameter of the blank 3, and to the axial length of the mold cavity. A single test run often suffices to insure proper selection of such inclination.

The means for pivoting the mold sections 4 of FIG. 2 between vertical and inclined positions may comprise any conventional automatic system, such as cams and followers, hydraulic and/or pneumatic cylinder and piston assemblies, electromagnets or others. Aside from the fact that the sections 4 are pivotable, the mold of FIG. 2 can be identical with or similar to conventional molds.

The apparatus of FIG. 2 is particularly suited for blowing of relatively short parisons. When the parisons are rather long, I prefer to employ an apparatus of the type shown in FIG. 3 which is also superior to the apparatus of FIG. 1 because it insures that the parison extends axially and centrally of the mold cavity. The apparatus of FIG. 3 is further preferred when the diameter of the blank is rather large so that, as in the case of long parisons, the parison is likely to flex or arch if it is held in an inclined position as shown in FIG. 2. Alternatively, the features of the apparatus shown in FIG. 3 can be combined with the feature of the apparatus shown in FIG. 2, i.e., the apparatus of FIG. 3 can comprise mold sections which are tiltable with reference to their platens.

FIG. 3 shows both mold sections 4a, 4b which are mounted on platens 5a, 5b movable toward and away from each other along tie rods 6 (only one shown). The means for moving the sections 4a, 4b between open and closed positions comprises two hydraulic or pneumatic cylinders whose piston rods are shown at 10a and 10b. The mold sections 4a, 4b have lower parts 11a, 11b which are movable relative to the remaining parts of the respective sections by double-acting cylinders 12a, 12b mounted on platens 5a, 5b and respectively accommodating pistons 13a, 13b having piston rods 14a, 14b which are coupled to the lower parts 11a, 11b.

When the extruder 1 moves relative to the mold or vice versa (in a direction at right angles to the plane of FIG. 3), the movable upper parts of the mold sections 4a, 4b close first to clamp the upper end 8 of the extruded portion of the blank 3 close the nozzle 2. The blank is thus severed or is severed by a separate knife to yield a parison which is attached to and moves with the mold. When the thus severed parison assumes a fully vertical position under the action of gravity, the lower parts 11a, 11b are moved toward each other with a certain delay to clamp the lower end of the parison prior to admission of air which expands it to convert it into a shaped article. The delay is sufficient to insure that the parison is coaxial with the mold cavity when its lower end is clampingly engaged by the lower parts 11a, 11b.

The advantages of the apparatus shown in FIG. 3 will be readily appreciated by considering the following: During closing of an open-and-shut blow mold, the mold sections move toward each other without changing their orientation. Thus, if a blank which is continuously extruded through the nozzle 2 is held in a vertical position and is located exactly midway between the sections of an open mold, its upper and lower ends should be engaged simultaneously when the mold is caused to close. This is the theoretical situation; however, in actual practice, the lower end of the blank 3 is cooler and hence stiffer than the upper end which is nearer to the nozzle 2. Moreover, the diameter of the lower end is normally greater than the diameter of the upper end because, as the nozzle 2 extrudes successive increments of the blank, the weight of extruded material causes a lengthening of the blank and a reduction of the diameter at the upper end. Such reduction of the diameter at the upper end, combined with greater stiffness of the lower end, causes the mold sections to firmly grip the lower end prior to gripping the upper end with the same force. Thus, the upper end is free to move relative to the mold sections in the direction of arrow A prior to being clamped against any further lateral movement with reference to the mold. Furthermore, the engaged portion of the blank should be severed from the remainder of the blank only after the upper end of such portion is clampingly engaged by the mold sections. This is desirable to insure that the upper end cannot slide into the interior of the mold cavity, i.e., that it remains properly engaged by the upper parts of mold sections during blowing. In other words, in a conventional apparatus, the lower portion of the blank cannot be separated from the remainder of the blank immediately after its lower end is engaged by the mold sections; consequently, some displacement of the lower end in the direction of relative movement is unavoidable. The exact moment when the lower portion can be severed from or torn off the remainder of the blank depends to a considerable extent on the characteristics of plastic material (particularly its toughness and plasticity) as well as on the characteristics (particularly the diameter and wall thickness) of the blank. However, such characteristics of the blank are not predictable with requisite accuracy because they depend on lengthening of the blank due to gravity, a factor which in turn depends on characteristics of plastic material. Therefore, the closing of a mold cannot be synchronized with relative movement between the extruder and the mold cavity with such accuracy that the axis of the engaged portion of the blank invariably coincides with the axis of the mold cavity. Moreover, the closing of a blow mold is normally carried out within a very short interval of time, as a rule less than one second, so that there is no time for full synchronization.

With the above in mind, and further assuming that the apparatus of FIG. 2 is used for conversion of relatively long parisons into hollow plastic articles, a long parison whose ends are clamped by the sections of an inclined mold of the type shown in FIG. 2 is likely to bend in the middle so that one side of its median portion touches the adjoining surface of the mold ahead of the other side. This brings about premature cooling of the one side and results in the production of an inferior hollow article. Therefore, and when the parisons are rather long, it is advisable to employ a somewhat more complicated mold, such as the one shown in FIG. 3, in order to insure that the long parison cannot flex and that its axis invariably coincides with the axis of the mold cavity. This is achieved by the simple expedient of gripping the upper end of a blank portion, permitting the thus engaged portion to assume a vertical position by gravity, and thereupon engaging its lower end prior to blowing.

FIG. 4 illustrates an apparatus which constitutes a modification of the just described apparatus. The mold sections 4a, 4b comprise upper parts or neck portions 15a, 15b which are reciprocable with reference to the remaining parts of the respective sections and are biased toward each other by helical springs 16a, 16b reacting against the platens 5a, 5b. When the sections 4a, 4b are moved fully apart, the blank 3 can readily enter the space between the parts 15a, 15b. The sections 4a, 4b are thereupon moved toward each other by piston rods 10a, 10b whereby the parts 15a, 15b engage and clamp the upper end 8 of the extruded portion of the blank 3 and remove therefrom a parison which is free to assume a truly vertical position under the action of gravity before its lower end is engaged and clamped by the lower parts of mold sections 4a, 4b. When the mold is closed, a suitable stop (not shown) prevents the parts 15a, 15b from moving away from each other during admission of compressed gas into the parison. Such gas can be admitted by a conventional mandrel, either from above or from below.

An advantage of the apparatus shown in FIG. 4 is that the upper parts 15a, 15b can move relative to the remaining parts of sections 4a, 4b without necessitating the provision of separate drives such as the parts 12a–14b of FIG. 3.

Without further analysis, the foregoing will so fully reveal the gist of the present invention that others can, by applying current knowledge, readily adapt it for various applications without omitting features which fairly constitute essential characteristics of the generic and specific aspects of my contribution to the art.

What is claimed as new and desired to be protected by Letters Patent is set forth in the appended claims:

1. In a method of producing blow-molded hollow plastic articles, a first step of continuously extruding a tubular blank of deformable plastic material and effecting continuous relative movement between the blank and a series of blowing stations whereby successive elongated portions of the blank enter successive blowing stations; a second step of severing successive portions of the blank at the respective stations so that each such portion yields a parison; a first additional step of clampingly engaging the lower end of each portion at the respective station ahead of the other end; and a second additional step of subsequently clampingly engaging the upper end of each such portion at the respective station so that the respective portion is inclined with reference to the next following portion of the blank when its upper end is engaged in the course of said second additional step.

2. The steps as defined in claim 1, wherein the inclination of each portion of the blank in the course of said second additional step is a function of the speed of said relative movement, of the distance between the ends of said portion of the blank, and of the diameter of the blank.

3. The steps as defined in claim 1, further comprising the steps of changing the position of inclination of each portion upon completion of said second additional step so that the axis of such portion is vertical.

4. In a method of producing blow molded hollow plastic articles, a first step of continuously extruding a tubular blank of deformable plastic material and effecting continuous relative movement between the blank and a series of blowing stations whereby successive elongated portions of the blank enter successive blowing stations; a second step of severing successive portions of the blank at the respective stations so that each such portion yields a parison; a first additional step of clampingly engaging the upper end of each portion at the respective station ahead of the other end; and a second additional step of clampingly engaging the lower end of each such portion at the respective station with a predetermined delay following completion of said first additional step so that each portion of the blank is free to assume a vertical position by gravity prior to engagement of its lower end.

5. A method as defined in claim 4, wherein each station is defined by a mold having sections provided with relatively movable parts one of which engages the one end and the other of which engages the other end of the respective portion.

6. In a blow molding apparatus, a combination comprising extruder means arranged to continuously extrude a tubular blank of deformable plastic material substantially vertically downwardly; mold means including a succession of open-and-shut blow molds each having sections movable between open and closed positions to define a mold cavity; conveyor means for effecting continuous relative movement between said extruder means and said mold means so that successive portions of the blank enter between the sections of successive molds in open position of such sections; and means for moving the sections of said molds in such a way that one end of each portion of the blank is clampingly engaged by the corresponding sections ahead of the other end, each of said molds comprising two sections which are pivotable so that the mold cavity defined by such sections is inclined when the sections engage the other end of the corresponding portion of the blank.

7. A combination as defined in claim 6, wherein said one end is the lower end of the corresponding portion of the blank.

8. A combination as defined in claim 7, further comprising means for facilitating the selection of inclination of said mold cavities during engagement of the upper ends of the respective portions of said blank.

9. A combination as defined in claim 7, wherein the sections of said molds are pivotable about horizontal axes.

10. A combination as defined in claim 7, further comprising means for automatically moving the sections of said molds between inclined and upright positions.

11. In a blow mold apparatus, a combination comprising extruder means arranged to continuously extrude a tubular blank of deformable plastic material substantially vertically downwardly; mold means including a succession of open-and-shut blow molds each having sections movable between open and closed positions to define a mold cavity, the section of each blow mold comprise parts which are movable with reference to the remaining parts thereof; conveyor means for effecting continuous relative movement between said extruder means and said mold means so that successive portions of the blank enter between the sections of successive molds in open position of such sections; and means for moving the sections of said molds and the movable parts thereof to engage the lower ends of corresponding portions of the blank with such a delay that the portion engaged by the remaining parts is free to assume a vertical position by gravity prior to being engaged at its lower end.

12. A combination as defined in claim 11, wherein said movable parts are the lower parts of the corresponding sections and wherein the remaining parts of such sections are the upper parts thereof, and further comprising means for biasing such upper parts toward each other so that such remaining parts are first to engage the upper ends of corresponding portions of the blank in response to movement of said sections toward each other.

13. A combination as defined in claim 12, further comprising means for temporarily blocking movement of said remaining parts away from each other during expansion of corresponding portions of the blank in the cavities of respective molds.

References Cited

UNITED STATES PATENTS

| | | | |
|---|---|---|---|
| 2,858,564 | 11/1958 | Sherman et al. | 264—99 |
| 3,048,889 | 8/1962 | Fischer et al. | 18—5(BO)X |
| 3,357,046 | 12/1967 | Pechthold | 264—98X |

FOREIGN PATENTS

| | | | |
|---|---|---|---|
| 451,496 | 5/1968 | Switzerland | 18—5BP |

ROBERT F. WHITE, Primary Examiner

T. J. CARVIS, Assistant Examiner

U.S. Cl. X.R.

18—5